United States Patent [19]

Hsu et al.

[11] 4,433,126

[45] Feb. 21, 1984

[54] MODIFIED PHENOL-FORMALDEHYDE RESIN AND THE PRODUCTION THEREOF

[75] Inventors: Oscar H. H. Hsu; Milford C. Tassler, both of St. Charles, Ill.

[73] Assignee: Masonite Corporation, Chicago, Ill.

[21] Appl. No.: 334,881

[22] Filed: Dec. 28, 1981

[51] Int. Cl.$^3$ .................. C08H 5/04; C08G 83/00
[52] U.S. Cl. .................................. 527/105; 528/1; 528/129; 428/528; 428/529
[58] Field of Search .............. 527/105; 528/1, 129; 428/528, 529

[56]  References Cited

U.S. PATENT DOCUMENTS

| | | | |
|---|---|---|---|
| 1,959,433 | 2/1931 | Loetscher | 260/1 |
| 2,782,241 | 2/1957 | Gray et al. | 528/1 |
| 2,868,743 | 1/1959 | Feigley, Jr. | 260/17.2 |
| 2,926,146 | 2/1960 | McCully | 528/1 |
| 2,938,893 | 5/1960 | Gray et al. | 528/1 |
| 3,405,053 | 10/1968 | Broadhead | 527/105 |
| 3,985,728 | 10/1976 | Lin | 536/120 |
| 4,009,073 | 2/1977 | Pozzo et al. | 162/132 |
| 4,045,386 | 8/1977 | Hartman | 527/105 |
| 4,175,148 | 11/1979 | Luck et al. | 428/171 |

OTHER PUBLICATIONS

Chang, C. D., and Kononenko, O. K., "Sucrose-Modified Phenolic Resins as Plywood Adhesives", *Adhesives Age*, Jul. 1962, pp. 36–40.

*Primary Examiner*—John Kight, III
*Assistant Examiner*—Nathan M. Nutter
*Attorney, Agent, or Firm*—Mason, Kolehmainen, Rathburn & Wyss

[57]  ABSTRACT

This application discloses a phenol-formaldehyde binding resin formed from phenol and formaldehyde in mole ratio of one mole of phenol to 2 to 3 moles of formaldehyde, the resin being modified by replacing from 5% to 50% of the phenol by an equivalent amount of a concentrated aqueous complex of phenolic and carbohydrate components from the process water from the steam digestion of wood chips without chemical addition, said resin being formed by heating said mixture of phenol, formaldehyde and aqueous complex with aqueous alkali to a temperature not exceeding about 100° C. until a resin having a Brookfield viscosity of at least 35 centipoises is produced, all weights being determined on a dry basis; and a method of producing said resin by reacting a concentrated aqueous extract obtained from the steam digestion of wood chips with phenol and formaldehyde under alkaline conditions at a temperature not exceeding about 100° C. until a resin with a Brookfield viscosity of at least about 35 cps is produced, the mole ratio of phenolic compounds (that is, the phenol plus the phenolic compounds in the aqueous extract) to formaldehyde being in the range from 1:2 to 1:3, the weight of concentrated aqueous extract being from 5% to 50% of the weight of the phenol, calculated on the dry weight of each material.

5 Claims, No Drawings

MODIFIED PHENOL-FORMALDEHYDE RESIN AND THE PRODUCTION THEREOF

This invention relates to a modified phenol-formaldehyde binding resin. More particularly it relates to a resin binder, especially adapted to bonding wood fibers and particles, comprising the condensation product of a phenol, formaldehyde and a water-soluble carbohydrate-phenol complex from steam digestion of wood chips, and the production thereof.

BACKGROUND OF THE INENTION

Hardboard, particle board and similar man-made board products are commonly produced from wood fibers and/or particles which are conventionally bonded into panels with thermosetting resins such as phenol-formaldehyde bonding agents. In the dry process for hardboard production, ligno-cellulosic fibers are first coated with a thermosetting resin binder, such as a phenol-formaldehyde resin, and are then randomly distributed into a mat by air blowing the resin-coated fibers onto a support member. The mat is pressed at temperatures up to about 450° F. and pressures less than about 1000 p.s.i. to compress the mat into an integral consolidated structure and to cure the thermosetting resin. In the wet process for hardboard production, ligno-cellulosic fibers are uniformly blended with water in a series of stock chests to form a slurry. Usually resin binder such as phenol-formaldehyde are added to the slurry where the resin is flocculated and deposited on the fiber surfaces. The slurry is then deposited onto a water-pervious support member, similar to a Fourdrinier wire, where much of the water is removed, leaving a wet mat of ligno-cellulosic material. The wet mat is transferred from the pervious support member and consolidated under heat and pressure to form the board. Typically, pressures of from 400 to 500 p.s.i. and temperatures up to about 450° F. are encountered in consolidation of a man-made board manufactured by the wet process.

The resin binders represent a substantial part of the cost of the hardboard or similar wood product and it has long been desired to reduce this cost factor. Usually costs have been reduced by decreasing the amounts of binder in the hardboard or wood product.

OBJECTS OF THE INVENTION

It is an object of this invention to provide an inexpensive resin binder for wood products, and a method for its production. It is another object to provide a phenol-formaldehyde resin binder which is less expensive than resin binders made from phenol and formaldehyde. It is a further object to provide a hardboard product which has physical characteristics comparable to and yet is less expensive than conventional hardboard made with unmodified phenol-formaldehyde binder. These and other objects are apparent from and are achieved in accordance with the following disclosure.

GENERAL DESCRIPTION OF THE INVENTION

This invention comprises a thermosettable resin binder composed of phenol, formaldehyde and a water-soluble complex of phenolic and carbohydrate components from steam digestion of wood chips. It also comprises the method of producing said resin binder and the use thereof in the production of man-made consolidated board products, including hardboard, chip board, particle board, panel board, acoustical board, insulation board and the like.

In accordance with this invention, an aqueous solution of the water-soluble complex of phenolic and carbohydrate components from steam digestion of wood chips, evaporated (concentrated) to a heavy brown liquid containing 56% to 62% solids by weight, is one of the components of a phenol-formaldehyde resin binder formulation. The water-soluble complex of phenolic and carbohydrate components typically contains 45–68% by weight of hemicellulose and monosaccharides, 18–35% by weight of water-soluble phenolic compounds, 3.8–8.75% ash and 4–5% acidic compounds.

AQUEOUS CARBOHYDRATE-PHENOLIC CONCENTRATE FROM WOOD

The unique component of the phenol-formaldehyde binder of this invention is a concentrated aqueous extract of carbohydrate and phenolic materials from the steam digestion (explosion) of wood chips, without chemical addition, by the procedures of the Mason U.S. Pat. Nos. 1,812,970 and 1,824,221. The process water from the wet process hardboard manufacturing procedure contains soluble carbohydrate and phenolic materials at a solids content from about 2.5% to 3.5%. This liquor, at a temperature of about 120° F., is fed into a series of four Swenson vacuum evaporators and four Vulcan vacuum evaporators. Steam at 250 p.s.i. flows through the evaporators in opposite direction to the flow of liquor. The concentrated liquor from the last Vulcan evaporator has a solids content of about 35% and a temperature of about 180° F. This then enters a Parkinson evaporator at high vacuum (27–28 inches of mercury) at 140 p.s.i. steam pressure. The effluent from the evaporator has a solids content of about 45% to 65%, preferably 56% to 62%. The overall heat contact time in the evaporators is about 30 to 45 minutes.

The effluent described above has a pH which may vary from 4.15 to 5.40, depending on the type of wood treated. The preferred pH range is from 4.6 to 4.8. Other properties include the following ranges:

Specific gravity (a function of solids content): 1.230 to 1.290 (at above solids content)

Viscosity (proportional to solids content and temperature): 440 to 8,500 centipoises (at above solids content, pH level, and 25° C.), usually 1000 to 2500 cps.

Reducing sugars: 2 to 5 percent (without hydrolysis), 45 to 68 percent (with hydrolysis)

Carbohydrates: 45 to 68 percent

Phenolic constituents: 18 to 35 percent

Other Components: a. Inorganic material (ash): 3.80 to 8.75 percent, including elements distributed as follows:

| Element | Percent of Total Solids |
| --- | --- |
| Aluminum | 0.018–0.032 |
| Magnesium | 0.027–0.290 |
| Calcium | 0.660–1.030 |
| Iron | 0.027–0.043 |
| Sodium | 0.960–1.070 |
| Manganese | 0.084–0.096 |
| Silicon (as dioxide) | 0.260–0.330 |
|  | 2.036–2.891 |

Ash, uronic acids, fibers, etc. 8–15%

The carbohydrates include simple sugars (monosaccharides) 2–5% and hemicellulose 43–63%. The carbohydrate fraction is composed of:

| | |
|---|---|
| Glucose | 5–15% |
| Mannose | 7–40% |
| Galactose | 4–13.5% |
| Arabinose | 5–6.5% |
| Xylose | 77–24% |
| Rhamnose | 2–1% |

Pentoses comprise about 32–84% of the sugars and hexoses about 16–68%.

The phenolic components resulting from the decomposition of lignin are substituted phenols derived from the propylmethoxyphenol units or nuclei or lignin. Lignin from wood contains two primary nuclei, in differing ratios for softwood and for hardwood. The first is the 3-methoxy-4-hydroxyphenylpropane nucleus; the second is the 3,5-dimethoxy-4-hydroxyphenylpropane nucleus. In softwood the ratio of 3-methoxy-4-hydroxyphenyl units to 3,5-dimethoxy-4-hydroxyphenyl units is about 10:1. In hardwood the ratio is about 1:1. On decomposition, the 3-methoxy-4-hydroxyphenylpropane nucleus provides a series of 3-methoxy-4-hydroxyphenyl compounds including guaiacol, 4-hydroxy-3-methoxybenzaldehyde, coniferyl alcohol, 4-methylguaiacol, 4-ethylguaiacol, isoeugenol, vanillin, and vanillic acid. Decomposition of the 3,5-dimethoxy-4-hydroxyphenylpropane nucleus provides a series of 3,5-dimethoxy-4-hydroxyphenyl compounds, including sinapyl aldehyde, sinapyl alcohol, sinapic acid, syringol, 4-methylsyringol, 4-ethyl-syringol, syringaldehyde, and syringic acid. Other decomposition products of lignin in the liquor include catechol, cresol, p-propylphenol, anisaldehyde, p-hydroxybenzaldehyde, and anisic acid.

DETAILED DESCRIPTION OF THE INVENTION

By the procedure of this invention it is possible to replace from 5% up to 50% of the phenol of a phenol-formaldehyde resin with a concentrated aqueous complex of phenolic and carbohydrate components from steam digestion of wood chips, said complex containing 56% to 62% solids. Ordinarily the phenol-formaldehyde resol resins are produced by reacting phenol with an excess of formaldehyde under basic conditions. Usually the mole ratio of phenol to formaldehyde is in the range from 1:2.0 to 1:3.0. The low molecular weight phenol-formaldehyde resin thus produced is homogeneous and soluble in alkaline water. It is added to the fiber slurry, as in the previously mentioned stock chest, where it flocculates and deposits on the fibers. The wet lap formed from the fiber slurry is consolidated under heat and pressure. During the latter step the resin sets to an infusible rigid resin which assists in binding the wood fibers into hardboard.

The concentrated (56–62% solids) aqueous extract of phenolic and carbohydrate components from the steam digestion of wood chips is equivalent to and can replace, on a dry weight basis, an equal weight of phenol in the phenol-formaldehyde resin, up to a maximum of about 50% of the dry weight of the phenol. Thus, a resin mix which ordinarily contains 1000 grams of phenol (dry weight) can be produced in equivalent form with from 50 grams up to 500 grams of the phenol (dry weight) replaced by the same weight of the concentrated aqueous extract from wood chips, determined on a dry weight basis. For example, if 500 grams of phenol (dry weight) are to be replaced, the amount of aqueous extract from wood chips (containing 60% solids) to replace the 500 grams of phenol would be 833.3 grams. In other respects the resin is not modified. The calculation of the mole ratio of phenol to formaldehyde is made on the basis that in this example 833.3 grams of the aqueous extract is equivalent to 500 grams of phenol and represents 5.31 moles.

The mixture of phenol and aqueous extract of wood is combined with aqueous formaldehyde, adjusted to pH in the range from 8.0 to 12.2, preferably 9.0 to 12.0, and maintained at 70°–100° C. until the viscosity reaches the desired level (35–350 centipoises, Brookfield). There is thus produced a resin having good shelf life suitable as a binder for hardboard.

The invention is further disclosed by the following examples which illustrate the production of modified phenol-formaldehyde resin binder materials. It will be understood by those skilled in the art that numerous modifications in quantities, operating conditions and the like may be made without departing from the invention as herein disclosed.

EXAMPLE 1

In a reactor were placed 793.5 grams of the previously described concentrated aqueous extract of wood (58 percent solids), 315.7 grams water, and 86.9 grams formaldehyde (37 percent). The mixture was agitated for ten minutes, followed by the addition of 48.4 grams 50 percent sodium hydroxide solution as a catalyst. The solution was heated to 75° C. and held for one hour. The viscosity of this resulting prepolymer after this treatment was approximately 40 centipoises (25° C.) and approximately 9.60 pH. This solution is used as component "A" of the final resin.

In another reactor were loaded 530.7 grams phenol (90 percent) and 1,072.6 grams formaldehyde (37 percent), forming a solution with a phenol-formaldehyde mole ratio of 1:2.6. Then 62.2 grams of 50 percent sodium hydroxide solution was added with agitation over a period of ten minutes, the addition being done carefully to avoid overheating beyond 80° to 85° C. in one-half hour. The reaction mixture was maintained at 80° to 85° C. for another one-half hour and cooled to 70° C. Then 62.2 grams of 50 percent sodium hydroxide solution were added slowly with agitation. The final alkalinity level was 7.10 percent, based on the overall weight of reactant. The resulting solution was heated to 80° to 85° C. until the viscosity reached 75 centipoises (25° C.). This prepolymer solution had the following properties at 25° C.:

Specific Gravity: 1.187
Viscosity: 75 cps
pH: 10.4
Refractive Index: 1.4680

The floc test was conducted by dropping a few drops of the prepolymer solution into very dilute acetic acid (pH 3.0); the solution turned immediately into a white, milky liquid with a brown precipitate, which indicated the product had a low molecular weight and high reactivity.

To this solution (1,727.7 grams) was added 1,000 grams water and 1,244.5 grams of the Component A, which was made and described above. As soon as the mixture was blended, 366.9 grams of 50 percent sodium hydroxide solution and 186.0 grams of formaldehyde (37 percent) were introduced into the reactor. The total alkalinity was 5.81 percent, based on the total solution at 32.5 percent solids basis. The temperature was raised to 90° to 92° C. until a viscosity of 50 centipoises was reached. The mixture was then cooled to 80° C. for easy control of the resin advancement. It was found that the final resin viscosity of 100 centipoises at this reaction stage would serve as the best resin. As soon as the viscosity reached 100 centipoises, the resin was cooled to 35° C. For improving the drainage ability of this resin, an additional 25 grams of phenol were added to the solution, the temperature was raised to 45° C., and held for one-half hour.

The resulting resin should have the following physical properties:
Solids Content: 32.5%
pH (at 25° C.): 11.3–11.6
Viscosity (at 25° C.): 200–350 cps
Alkalinity: 5.6–5.9%
Flocculation (at 85° C.): Floc with clear supernatant.

This resin has a shelf life of two weeks at 40° C. This resin can be diluted with water to the 21 percent solids level to further stabilize it. The resulting modified phenol-formaldehyde resin was found to be effective as a binder for ⅛, ¼, ⅜, 7/16, ½-inch and other thickness hardboard; the results for 7/16-inch hardboard are described in Table 1.

TABLE 1

Tabulation of board properties with conventional phenol-formaldehyde resin versus modified phenol-formaldehyde resin

| Binder System | Specific Gravity | Average* Modulus of Rupture (psi) | 24-Hour Soak Percent Water Absorption | 24-Hour Soak Percent Caliper Swell |
|---|---|---|---|---|
| Control PF Resin | 0.96 | 3,091 | 7.47 | 5.13 |
| Modified PF Resin-1** | 0.94 | 3,886 | 7.38 | 4.24 |
| Modified PF Resin-2** | 0.93 | 2,906 | 8.84 | 5.16 |
| Modified PF Resin-3** | 0.93 | 3,318 | 9.73 | 4.44 |

1.5 percent resin binder
*Average of three boards
**-1, -2, -3: Modified phenol-formaldehyde resin from different batches 7/16 inch thick hardboard 400° F. core temperature

EXAMPLE 2

Into a reactor were loaded 432.2 grams of phenol (100 percent), 1,173.9 grams of water, and 682.4 grams of the previously described concentrated wood extract (58 percent solids). To this mixture was slowly added caustic soda (348.1 grams of 50 percent aqueous solution) and the mixture was heated to 85° C. for two hours, then cooled to 60° C. Formaldehyde (642.1 grams of 50 percent aqueous solution) was added slowly with good agitation and the temperature of the mixture was held at 90° C.

Then 214 grams of formaldehyde (50 percent) and 391.3 grams of water were added and the mixture held at 90° C. until the viscosity reached 50 centipoises (Brookfield). The mixture was held at 80° C. until 125 centipoise viscosity (Brookfield) was reached.

The resin so formed had the following properties:
Solids Content: 32.5%
pH: 11.4
Viscosity (25° C.): 125 cps
Alkalinity: 5.7%
Flocculation (85° C.): Floc with clear supernatant This resin has a shelf life of two weeks at 40° C. If its pH is raised to 11.6 by adding 50 percent caustic soda, the shelf life can be extended to one month without a reduction in properties. The resulting modified phenol-formaldehyde resin was found to be effective as a binder for ⅛, ¼, ⅜, 7/16, ½-inch, and other thickness hardboard; the results for 7/16 inch hardboard are described in Table 2.

TABLE 2

Tabulation of board properties with conventional phenol-formaldehyde resin versus modified phenol-formaldehyde resin

| Samples | Specific Gravity | Modulus of Rupture (psi) | 24-Hour Soak Percent Water Absorption | 24-Hour Soak Percent Caliper Swell |
|---|---|---|---|---|
| Control PF Resin-1 | 0.94 | 3,400 | 22.53 | 4.18 |
| Control PF Resin-2 | 0.88 | 3,700 | 17.97 | 3.64 |
| Control PF Resin-3 | 0.89 | 4,700 | 17.43 | 3.32 |
| Control PF Resin-4 | 0.94 | 4,600 | 19.56 | 3.21 |
| Modified PF Resin-1 | 0.95 | 3,900 | 19.14 | 3.64 |
| Modified PF Resin-2 | 0.85 | 3,400 | 18.57 | 3.83 |
| Modified PF Resin-3 | 0.90 | 4,200 | 18.13 | 3.53 |
| Modified PF Resin-4 | 0.94 | 4,800 | 19.13 | 3.64 |

1.5 percent resin binder
-1, -2, -3, and -4: resin from different batches
7/16 inch thick hardboard
300° F. core temperature

EXAMPLE 3

Into a reactor were loaded 1,983.5 grams of formaldehyde (37 percent), 567.1 grams of the previously described concentrated wood extract (58 percent solids), 767.6 grams of phenol (100 percent), and 1,207 grams of water. To this mixture was slowly added with good agitation over a period of 45 to 50 minutes, 399.2 grams of caustic soda (50 percent). The mixture was warmed to 90° C. and maintained for two hours, then cooled to 30° C.

The resin so formed had the following physical properties:
Solids Content: 36%
pH: 10.0
Viscosity (25° C.): 40 seconds No. 1 Zahn Cup
Alkalinity: 5.0%
Flocculation (85° C.): Floc with clear supernatant This resin has a shelf life of two weeks at 40° C.; however, if the solids content is reduced to approximately 20 percent, the shelf life is extended beyond one month without a reduction in properties. The resulting modified phenol-formaldehyde resin was found to be an effective binder for ¼, ⅛, ⅜, and 7/16 inch and other thickness hardboard. The results for 7/16 inch hardboard are described in Table 3.

TABLE 3

Tabulation of board properties with conventional phenol-formaldehyde resin versus modified phenol-formaldehyde resin

| Samples | Specific Gravity | Modulus of Rupture (psi) | 24-Hour Soak Percent Water Absorption | 24-Hour Soak Percent Caliper Swell |
|---|---|---|---|---|
| Control PF Resin-1 | 0.909 | 3,640 | 9.74 | 5.04 |
| Modified PF Resin-1 | 0.915 | 4,102 | <10.00 | <7.00 |

1 percent resin binder
7/16 inch thick hardboard
400° F. core temperature

We claim:

1. A method of forming a modified phenol-formaldehyde binding resin for ligno-cellulose fibers, comprising reacting a concentrated aqueous extract obtained from the steam digestion of wood chips with phenol and formaldehyde under alkaline conditions at a temperature not exceeding about 100° C. until a resin with a viscosity of at least about 35 cps (Brookfield) is produced, the mole ratio of phenolic compounds to formaldehyde being in the range from 1:2 to 1:3, the weight of concentrated aqueous extract being from 5% to 50% of the weight of the phenol, calculated on the dry weight of each material.

2. Method of claim 1 wherein the concentrated aqueous extract of wood chips contains 45% to 65% solids.

3. Method of claim 2 wherein the concentrated aqueous extract of wood chips is reacted with formaldehyde to produce a prepolymer which is thereafter combined with a phenol-formaldehyde prepolymer and heated until the desired viscosity of the resulting resin is obtained.

4. Method of claims 1, 2 or 3 wherein the amount of concentrated aqueous extract of wood chips is about 30–50% of the weight of the phenol.

5. A phenol-formaldehyde binding resin formed from phenol and formaldehyde in mole ratio of one mole of phenol to 2 to 3 moles of formaldehyde, wherein from 5% to 50% of the phenol is replaced by an equivalent amount of a concentrated aqueous complex of phenolic and carbohydrate components from the process water from the steam digestion of wood chips without chemical addition, said resin being formed by heating said mixture of phenol, formaldehyde and aqueous complex with aqueous alkali to a temperature not exceeding about 100° C. until a resin having a Brookfield viscosity of at least about 35 centipoises is produced, all weights being determined on a dry basis.

* * * * *